United States Patent
Gu et al.

(10) Patent No.: US 12,147,890 B2
(45) Date of Patent: Nov. 19, 2024

(54) NEURAL NETWORK COMPUTING DEVICE AND CACHE MANAGEMENT METHOD THEREOF

(71) Applicant: GlenFly Technology Co., Ltd., Shanghai (CN)

(72) Inventors: Deming Gu, Shanghai (CN); Wei Zhang, Shanghai (CN); Yuanfeng Wang, Shanghai (CN); Guixiang He, Shanghai (CN)

(73) Assignee: GlenFly Technology Co., Ltd., Shanghai (CN)

( * ) Notice: Subject to any disclaimer, the term of this patent is extended or adjusted under 35 U.S.C. 154(b) by 580 days.

(21) Appl. No.: 16/990,953

(22) Filed: Aug. 11, 2020

(65) Prior Publication Data

US 2021/0397934 A1 Dec. 23, 2021

(30) Foreign Application Priority Data

Jun. 19, 2020 (CN) .......................... 202010564773.8

(51) Int. Cl.
*G06N 3/063* (2023.01)
*G06F 12/0891* (2016.01)
*G06N 3/08* (2023.01)

(52) U.S. Cl.
CPC ......... *G06N 3/063* (2013.01); *G06F 12/0891* (2013.01); *G06N 3/08* (2013.01); *G06F 2212/60* (2013.01)

(58) Field of Classification Search
CPC ...... G06N 3/063; G06N 3/08; G06F 12/0891; G06F 2212/60
See application file for complete search history.

(56) References Cited

U.S. PATENT DOCUMENTS 11,614,964 B2 * 3/2023 Gao ................. G06N 3/063
 718/104
2017/0316306 A1 * 11/2017 Katayama .......... G06N 3/063

FOREIGN PATENT DOCUMENTS

CN 111104459 5/2020
EP 3408798 A1 * 12/2018 ......... G06F 12/0851
(Continued)

OTHER PUBLICATIONS

Ghose et al. ("The processing-in-memory paradigm: Mechanisms to enable adoption." Beyond-CMOS Technologies for Next Generation Computer Design (2019): 133-194.) (Year: 2019).*

(Continued)

*Primary Examiner* — Li B. Zhen
*Assistant Examiner* — Moriam Mosunmola Godo
(74) *Attorney, Agent, or Firm* — JCIPRNET (57) ABSTRACT

A neural network computing device and a cache management method thereof are provided. The neural network computing device includes a computing circuit, a cache circuit and a main memory. The computing circuit performs a neural network calculation including a first layer calculation and a second layer calculation. After the computing circuit completes the first layer calculation and generates a first calculation result required for the second layer calculation, the cache circuit retains the first calculation result in the cache circuit until the second layer calculation is completed. After the second layer calculation is completed, the cache circuit invalidates the first calculation result retained in the cache circuit to prevent the first calculation result from being written into the main memory.

7 Claims, 4 Drawing Sheets

(56) References Cited

FOREIGN PATENT DOCUMENTS

| | | |
|---|---|---|
| TW | 201839607 | 11/2018 |
| TW | I673678 | 10/2019 |
| TW | 202022711 | 6/2020 |
| WO | 2020108486 | 6/2020 |

OTHER PUBLICATIONS

"Office Action of Taiwan Counterpart Application", issued on Apr. 26, 2021, p. 1-p. 4.

* cited by examiner

NEURAL NETWORK COMPUTING DEVICE AND CACHE MANAGEMENT METHOD THEREOF

CROSS-REFERENCE TO RELATED APPLICATION

This application claims the priority benefit of China application no. 202010564773.8, filed on Jun. 19, 2020. The entirety of the above-mentioned patent application is hereby incorporated by reference herein and made a part of this specification.

TECHNICAL FIELD

The invention relates to an electronic computing device, and more particularly, to a neural network computing device and a cache management method thereof.

BACKGROUND

A cache is a memory that can perform a high-speed data exchange with a central processing unit (CPU). The cache is disposed between a main memory and the central processing unit. The cache is generally composed of a static random access memory (SRAM). The SRAM structure is quite complicated. Due to cost considerations, a capacity of the cache is limited. The cache is used to store a copy of a small amount of data of the main memory. When the central processing unit is processing data, the central processing unit will first go to the cache to find the data. If the data has been temporarily stored in the cache, the central processing unit does not need to read the data from the main memory. If the central processing unit cannot find the data in the cache, the central processing unit needs to find the data in the main memory, so that the system speed will slow down.

Over time, the most frequently accessed data will not remain unchanged. In other words, less frequently accessed data may now need to be accessed frequently; the data accessed frequently may be less frequently accessed now. Accordingly, the data in the cache should be replaced according to a certain algorithm to ensure that the data in the cache is accessed most frequently. In addition, when there is not enough free space in the cache to store data, it is necessary to write some of the data already in the cache back to the main memory according to a replacement strategy, and then read required data from the main memory to the cache. The traditional cache management method is to divide a cache space into many groups based on the least recently used (LRU) algorithm or the pseudo least recently used (Pseudo-LRU, PLRU) algorithm. Each group has 16 or 32 cache lines, and a relative age of each cache line will be counted. In general (in a general application field), the oldest cache line has the lowest probability of being accessed again. Based on the relative age of each cache line, the cache lines with older age will be replaced first.

However, in application field of artificial intelligence (AI), the traditional cache management method will cause some problems. One of the problems is that when the cache space is insufficient, the old data will be removed from the cache (written back to the main memory) to free space for the newly written data. Unfortunately, since AI has a high reuse rate for data, the data in the cache may be replaced before it is being used (removed from the cache). Yet, the newly written data may only be used after a long time. When it is necessary to access the replaced data, the data is read back from the main memory to the cache again. Therefore, the traditional cache management method will often increase a memory traffic in the field of AI.

In addition, convolutional neural network (CNN) or other AI calculations often include multi-layer calculations. A calculation result of a previous layer calculation can be used for a current layer calculation. After the current layer calculation is completed, the calculation result of the previous layer calculation will not be used again. Therefore, the calculation result of the previous layer calculation will occupy valuable space of the cache. When the cache space is insufficient, the traditional cache management method is will write (write back) the calculation result of the previous layer calculation to the main memory to free the cache space. However, the calculation result that will not be used again does not need to be written (written back) to the main memory. That is why the traditional cache management method will often increase the memory traffic in the field of AI.

As the application of AI technology becomes more extensive, more chip design manufacturers begin to design AI chips. A cache size and a bandwidth (especially a data transmission bandwidth between the cache and the main memory) are limited due to practical factors. Under the premise of the limited cache size and bandwidth, how to reduce a data transmission between the cache and the main memory is one of the topics in the field of AI technology.

It should be noted that, the content in the paragraph "Description of Related Art" are intended to assist understanding the invention. Part of the content (or all content) disclosed in the paragraph "Description of Related Art" may not be the conventional technology known by a person of ordinary skill in the art. The content disclosed in the paragraph "Description of Related Art" may not mean the content is known by a person of ordinary skill in the art before application of the invention.

SUMMARY

The invention provides a neural network computing device and a cache management method thereof to minimize the data transmission between the cache and the main memory.

In an embodiment of the invention, the neural network computing device includes a computing circuit, a cache circuit and a main memory. The computing circuit is applicable to perform a neural network calculation, wherein the neural network calculation includes a first layer calculation and a second layer calculation. The cache circuit is coupled to the computing circuit and the main memory. After the computing circuit completes the first layer calculation and generates a first calculation result required for the second layer calculation, the cache circuit retains the first calculation result in the cache circuit until the second layer calculation is completed. After the second layer calculation is completed, the cache circuit invalidates the first calculation result retained in the cache circuit to prevent the first calculation result from being written into the main memory.

In an embodiment of the invention, the cache management circuit includes: performing a neural network calculation by a computing circuit, wherein the neural network calculation includes a first layer calculation and a second layer calculation; after the computing circuit completes the first layer calculation and generates a first calculation result required for the second layer calculation, retaining the first calculation result in a cache circuit until the second layer calculation is completed; and after the second layer calculation is completed, invalidating the first calculation result retained in the cache circuit to prevent the first calculation result from being written into a main memory.

Based on the above, the neural network computing device and the cache management method thereof described in the embodiments of the invention are applicable to the field of artificial intelligence (AI). After the computing circuit completes the first layer calculation, the first calculation result may be retained (locked) in the cache circuit until the second layer calculation finish using the first calculation result. Therefore, the cache circuit can ensure that the first calculation result is not removed from the cache circuit to prevent the first calculation result from being read from the main memory. After the second layer calculation is completed, the first calculation result retained in the cache circuit can be invalidated instantly to free the cache space and prevent the first calculation result from being written into the main memory. Therefore, the neural network computing device can minimize the data transmission between the cache circuit and the main memory.

To make the aforementioned more comprehensible, several embodiments accompanied with drawings are described in detail as follows.

DETAILED DESCRIPTION

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms such as "first", "second" and the like as recited in full text of the specification (including claims) are intended to give the elements names or distinguish different embodiments or scopes, and are not intended to limit an upper limit or a lower limit of the number of the elements nor limit an order of the elements. Moreover, wherever possible, elements/components/steps with same reference numerals represent same or similar parts in the drawings and embodiments. Elements/components/steps with the same reference numerals or names in different embodiments may be cross-referenced.

Figure 1:
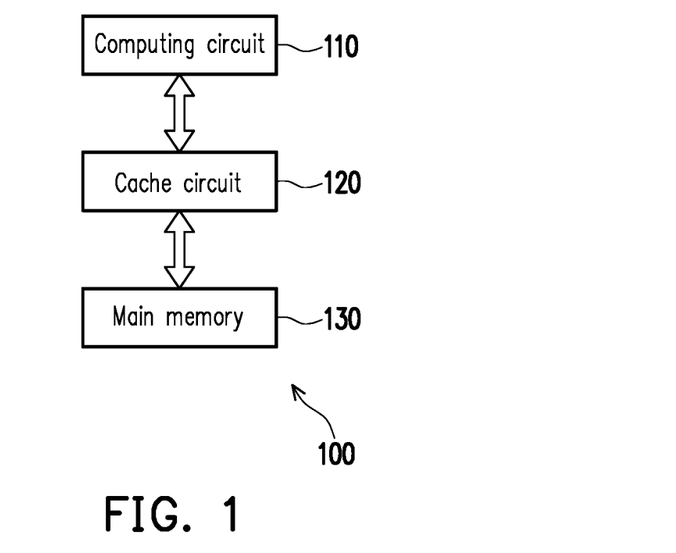
FIG. 1 is a circuit block diagram of a neural network computing device according to an embodiment of the invention.

FIG. 1 is a circuit block diagram of a neural network computing device 100 according to an embodiment of the invention. The neural network computing device 100 shown in FIG. 1 is applicable to the field of Artificial Intelligence (AI). The neural network computing device 100 can perform a neural network calculation. According to design requirements and (or) application requirements, the neural network calculation may include CNN (Convolutional Neural Network) calculation and (or) other Artificial Intelligence (AI) calculations.

The neural network computing device 100 includes a computing circuit 110, a cache circuit 120 and a main memory 130. According to design requirements, the computing circuit 110 may include a central processing unit (CPU), a microprocessor, an application-specific integrated circuit (ASIC), and a digital signal processor (DSP) and (or) other computing circuits. According to design requirements, the cache circuit 120 may include a static random access memory (SRAM) and (or) other memories. According to design requirements, the main memory 130 may include a dynamic random access memory (DRAM) and (or) other memories.

The computing circuit 110 can perform the neural network calculation. Here, the neural network calculation includes a first layer calculation and a second layer calculation. The cache circuit 120 is coupled to the computing circuit 110 and the main memory 130. The computing circuit 110 can exchange required data for the neural network calculation with the main memory 130 through the cache circuit 120. The computing circuit 110 first searches the cache circuit 120 for the required data. If not found, the required data will be read from the main memory 130 back to the cache circuit 120. Then, the computing circuit 110 reads the required data from the cache circuit 120.

Figure 2:
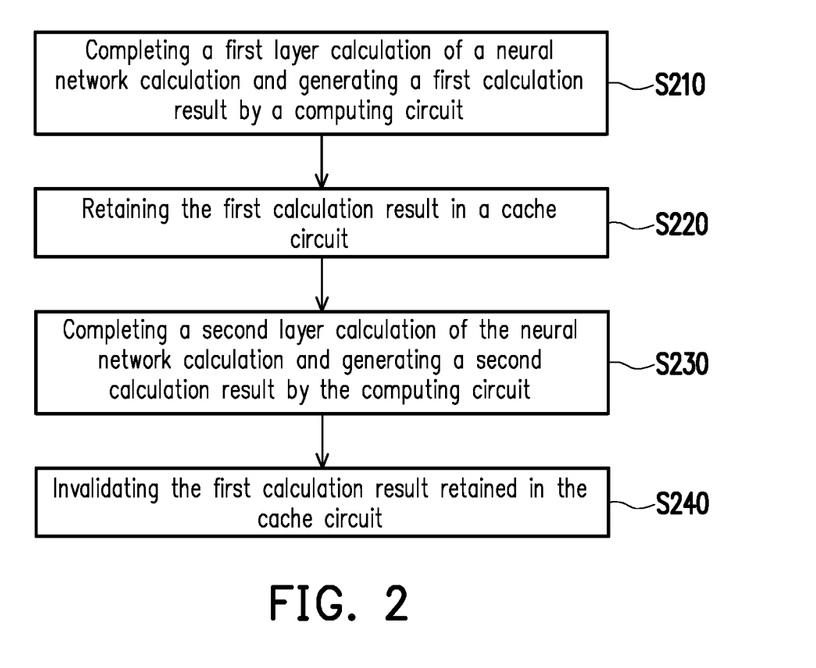
FIG. 2 is a flowchart of a cache management method of the neural network computing device according to an embodiment of the invention.

FIG. 2 is a flowchart of a cache management method of the neural network computing device 100 according to an embodiment of the invention. The cache management method shown in FIG. 2 is applicable to the field of AI. Referring to FIG. 1 and FIG. 2, in step S210, the computing circuit 110 can perform the first layer calculation of the neural network calculation. The computing circuit 110 can complete the first layer calculation to generate a first calculation result required for the second layer calculation (step S210). In step S220, based on the control of the computing circuit 110, the cache circuit 120 can retain the first calculation result in the cache circuit 120 until the second layer calculation is completed. After the computing circuit 110 completes the first layer calculation, the first calculation result may be retained (locked) in the cache circuit 120 until the second layer calculation finish using the first calculation result (i.e., the second layer calculation no longer needs to use the first calculation result). Accordingly, the cache circuit 120 can ensure that the first calculation result is not removed from the cache circuit 120, so as to prevent the first calculation result from being read from the main memory 130. Therefore, the neural network computing device 100 can minimize the data transmission between the cache circuit 120 and the main memory 130.

In step S230, the computing circuit 110 can perform the second layer calculation of the neural network calculation by using the first calculation result. The computing circuit 110 can complete the second layer calculation to generate a second calculation result (step S230). In step S240, based on the control of the computing circuit 110, the cache circuit 120 can invalidate the first calculation result retained in the cache circuit 120. After the second layer calculation is completed, the first calculation result retained in the cache circuit 120 can be invalidated instantly to free the cache space and prevent the first calculation result from being written into the main memory 130. Therefore, the neural network computing device 100 can minimize the data transmission between the cache circuit 120 and the main memory 130.

Figure 3:
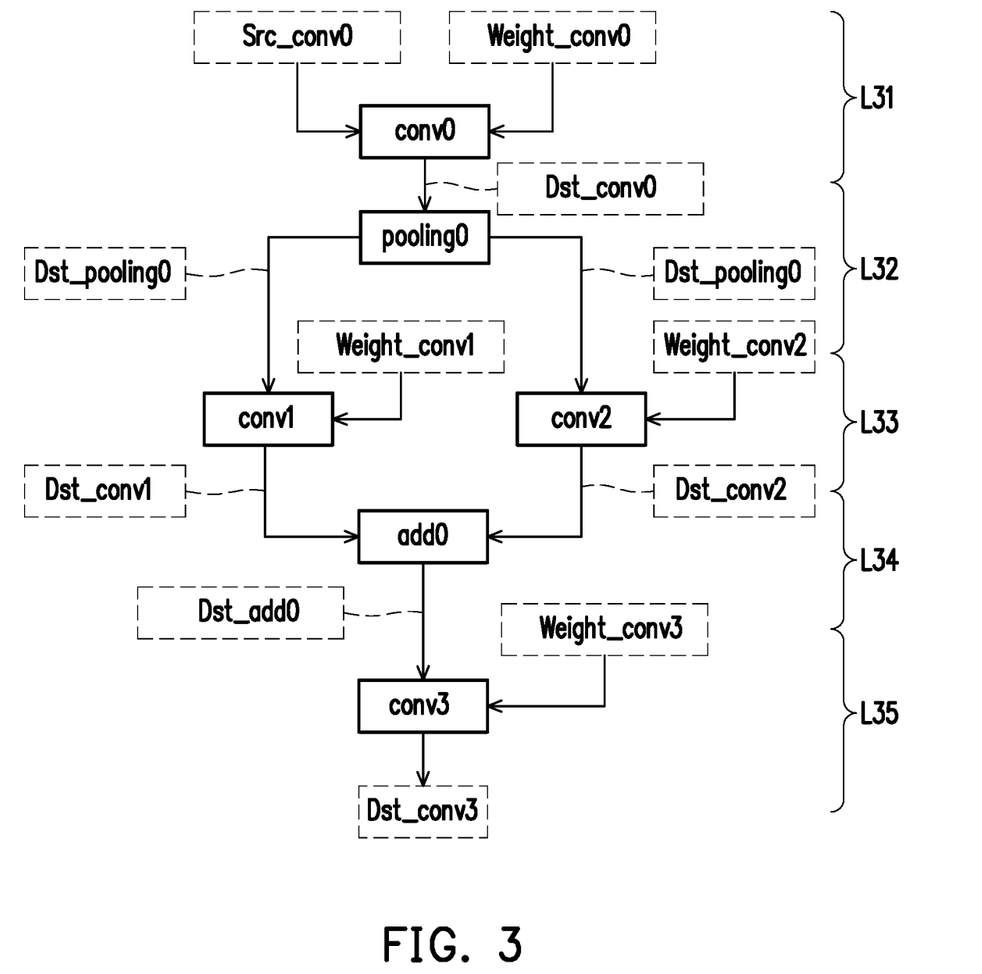
FIG. 3 is a schematic diagram of a partial structure of a neural network calculation according to an embodiment of the invention.

FIG. 3 is a schematic diagram of a partial structure of a neural network calculation according to an embodiment of the invention. In FIG. 3, dotted boxes represent input variables required for the neural network calculation, and solid boxes represent calculation operations. Referring to FIG. 1 and FIG. 3, the computing circuit 110 can perform the neural network calculation shown in FIG. 3. The neural network calculation shown in FIG. 3 includes an A layer calculation L31, a B layer calculation L32, A C layer calculation L33, A D layer calculation L34 and an E layer calculation L35. The A layer calculation L31 includes a single calculation operation conv0, such as a convolutional calculation. The cache circuit 120 can provide source matrix data Src_conv0 (source data) and weight matrix data Weight_conv0 (weight data) to the computing circuit 110 for the A layer calculation L31 to use, that is, as two inputs to the calculation operation conv0. The computing circuit 110 can perform and complete the calculation operation conv0 to generate a calculation result Dst_conv0. The calculation result Dst_conv0 can be retained in the cache circuit 120 until the B layer calculation L32 is completed (i.e., the B layer calculation L32 no longer needs to use the calculation result Dst_conv0). After the computing circuit 110 completes the A layer calculation L31 (the calculation operation conv0), the source matrix data Src_conv0 in the cache circuit 120 can be invalidated instantly to free the cache space and prevent the source matrix data Src_conv0 from being written into the main memory 130.

The B layer calculation L32 shown in FIG. 3 includes a single calculation operation pooling0, such as a pooling calculation. When the computing circuit 110 performs the B layer calculation L32 after the A layer calculation L31 is completed, the cache circuit 120 can provide the calculation result Dst_conv0 to the computing circuit 110 for the B layer calculation L32 to use. That is to say, the computing circuit 110 can read the calculation result Dst_conv0 from the cache circuit 120 as an input to the calculation operation pooling0. The computing circuit 110 can perform and complete the calculation operation pooling0 to generate a calculation result Dst_pooling0. The calculation result Dst_pooling0 can be retained (locked) in the cache circuit 120 until the C layer calculation L33 is completed (i.e., the C layer calculation L33 no longer needs to use the calculation result Dst_pooling0). After the B layer calculation L32 (the calculation operation pooling0) is completed, the calculation result Dst_conv0 in the cache circuit 120 can be invalidated instantly to free the cache space and prevent the calculation result Dst_conv0 from being written into the main memory 130.

When the computing circuit 110 performs the C layer calculation L33 after the B layer calculation L32 is completed, the cache circuit 120 can provide the calculation result Dst_pooling0 and weight matrix data Weight_conv1 to the computing circuit 110 for the C layer calculation L33 to use. The C layer calculation L33 shown in FIG. 3 includes a plurality of calculation operations conv1 and conv2, such as convolutional calculations. That is to say, the computing circuit 110 can read the calculation result Dst_pooling0 from the cache circuit 120 as an input to the calculation operation conv1 and the calculation operation conv2. By using the calculation result Dst_pooling0 and the weight matrix data Weight_conv1, the computing circuit 110 can perform and complete the calculation operation conv1 to generate a calculation result Dst_conv1. By using the calculation result Dst_pooling0 and weight matrix data Weight_conv2, the computing circuit 110 can perform and complete the calculation operation conv2 to generate a calculation result Dst_conv2. The calculation results Dst_conv1 and Dst_conv2 can be retained in the cache circuit 120 until the D layer calculation L34 is completed (i.e., the D layer calculation L34 no longer needs to use the calculation results Dst_conv1 and Dst_conv2). After the C layer calculation L33 (the calculation operations conv1 and conv2) is completed, the calculation result Dst_pooling0 in the cache circuit 120 can be invalidated instantly to free the cache space and prevent the calculation result Dst_pooling0 from being written into the main memory 130.

When the computing circuit 110 performs the D layer calculation L34 after the C layer calculation L33 is completed, the cache circuit 120 can provide the calculation results Dst_conv1 and Dst_conv2 to the computing circuit 110 for the D layer calculation L34 to use. The D layer calculation L34 shown in FIG. 3 includes a single calculation operation add0, such as an addition calculation. The computing circuit 110 can read the calculation results Dst_conv1 and Dst_conv2 from the cache circuit 120 as inputs to the calculation operation add0. By using the calculation results Dst_conv1 and Dst_conv2, the computing circuit 110 can perform and complete the calculation operation add0 to generate a calculation result Dst_add0. The calculation result Dst_add0 can be retained in the cache circuit 120 until the E layer calculation L35 is completed (i.e., the E layer calculation L35 no longer needs to use the calculation result Dst_add0). After the D layer calculation L34 (the calculation operation add0) is completed, the calculation results Dst_conv1 and Dst_conv2 in the cache circuit 120 can be invalidated instantly to free the cache space and prevent the calculation result Dst_conv1 and Dst_conv2 from being written into the main memory 130.

When the computing circuit 110 performs the E layer calculation L35 after the D layer calculation L34 is completed, the cache circuit 120 can provide the calculation result Dst_add0 and weight matrix data Weight_conv3 to the computing circuit 110 for the E layer calculation L35 to use. The E layer calculation L35 shown in FIG. 3 includes a single calculation operation conv3, such as a convolutional calculation. The computing circuit 110 can read the calculation result Dst_add0 and the weight matrix data Weight_conv3 from the cache circuit 120 as inputs to the calculation operation conv3. By using the calculation result Dst_add0 and the weight matrix data Weight_conv3, the computing circuit 110 can perform and complete the calculation operation conv3 to generate a calculation result Dst_conv3. After the E layer calculation L35 (the calculation operation conv3) is completed, the calculation result Dst_add0 in the cache circuit 120 can be invalidated instantly to free the cache space and prevent the calculation result Dst_add0 from being written into the main memory 130.

Figure 4:
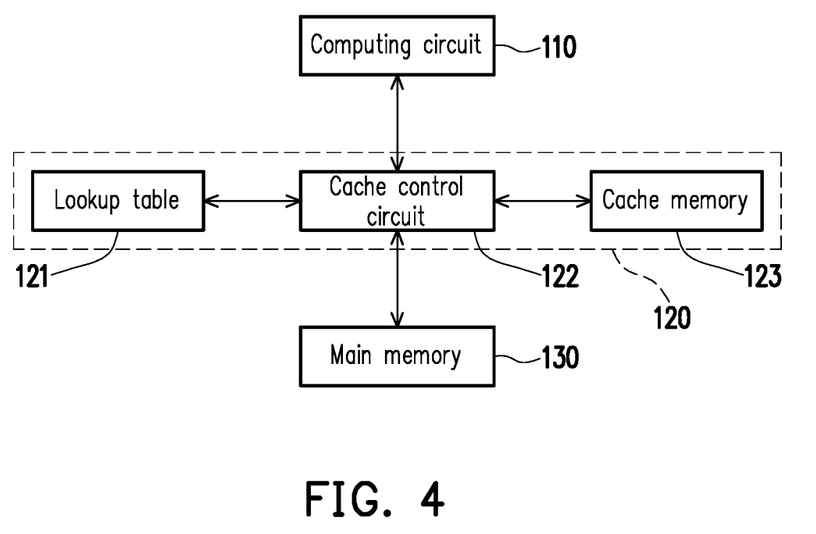
FIG. 4 is a circuit block diagram of the cache circuit shown in FIG. 1 according to an embodiment of the invention.

FIG. 4 is a circuit block diagram of the cache circuit 120 shown in FIG. 1 according to an embodiment of the invention. The cache circuit 120 shown in FIG. 4 includes a lookup table 121, a cache control circuit 122 and a cache memory 123. The cache control circuit 122 is coupled to the computing circuit 110 and the cache memory 123. According to design requirements, the cache memory 123 may include a static random access memory (SRAM) and (or) other memories. According to design requirements, the lookup table 121 can include an address mapping table, data type information, reference count information, and (or) other lookup information. The cache control circuit 122 can access the lookup table 121 and perform a hit/miss test of cached data.

The cache control circuit 122 can manage the cache memory 123. The computing circuit 110 can send a read command to the cache control circuit 122, so that the cache control circuit 122 transmits the required data from the cache memory 123 back to the computing circuit 110. If the cache memory 123 does not have the required data, the cache control circuit 122 reads the required data from the main memory 130 to the cache memory 123. Then, the cache control circuit 122 transmits the required data from the cache memory 123 back to the computing circuit 110.

After the computing circuit 110 completes the first layer calculation and generates a first calculation result required for the second layer calculation, the cache control circuit 122 retains the first calculation result in the cache memory 123 until the second layer calculation is completed. When the computing circuit 110 performs the second layer calculation after the first layer calculation is completed, the cache control circuit 122 can transmit the first calculation result from the cache memory 123 to the computing circuit 110 for the second layer calculation to use. After the second layer calculation is completed, the cache control circuit 122 can invalidate the first calculation result retained in the cache memory 123 to prevent the first calculation result from being written into the main memory 130. The operation of the cache control circuit 122 can refer to the related descriptions of FIG. 2 and (or) FIG. 3, which will not be repeated hereinafter.

Figure 5:
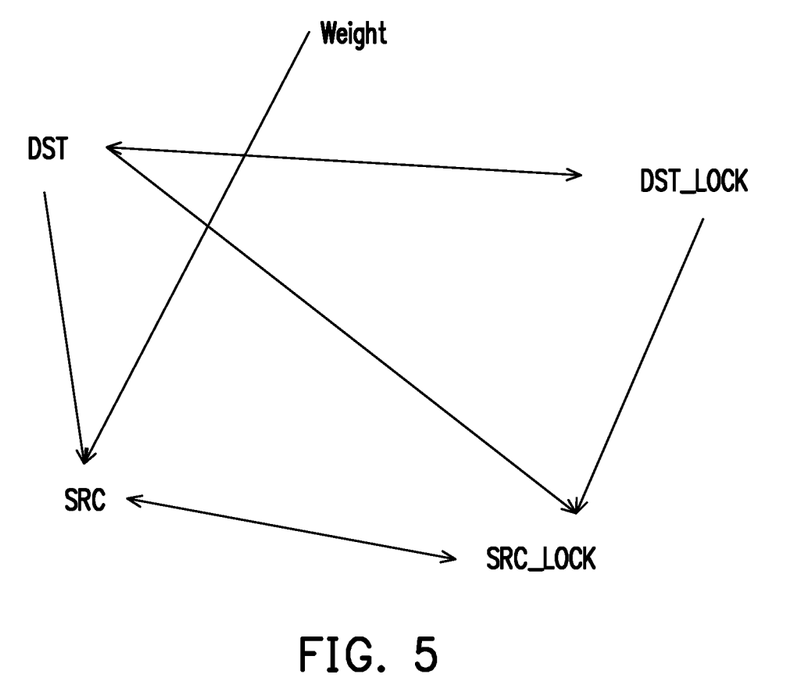
FIG. 5 is a schematic diagram illustrating a conversion relationship of data type according to an embodiment of the invention.

The lookup table 121 can include relevant information of data type. Each valid cache line in the cache memory 123 is assigned with 3 bits for recording the data type. The data type bits corresponding to these cache lines are arranged in the lookup table 121. The data type can be defined/set according to design requirements. For instance, FIG. 5 is a schematic diagram illustrating a conversion relationship of data type according to an embodiment of the invention. In the embodiment shown in FIG. 5, the data type can include a weight type "Weight", a source type "SRC", a destination type "DST", a source lock type "SRC_LOCK" and a destination lock type "DST_LOCK".

The cache circuit 120 can define data of the neural network calculation as one of the weight type "Weight", the source type "SRC", the destination type "DST", the source lock type "SRC_LOCK" and the destination lock type "DST_LOCK". When the data is defined as the source lock type "SRC_LOCK" or the destination lock type "DST_LOCK", the cache circuit 120 can ensure that the data is not removed from the cache circuit 120. When the data is defined as the weight type "Weight", the data will have the highest priority. In other words, when one cache line in the cache memory 123 is marked as the weight type "Weight", that cache line will not be replaced out so that the weight data is constantly retained in the cache memory 123. Accordingly, a good performance improvement is obtained based on the priority of the weight.

The lookup table 121 can include relevant information of data type shown in FIG. 5. For instance, data type codes shown in Table 1 below can be used to represent data types shown in FIG. 5. Different data types correspond to different bit patterns. In any case, the data types codes can be defined according to design requirements. The data type codes in other embodiments should not be limited to the embodiment shown in Table 1.

TABLE 1 data type codes

| Data type | Bit pattern |
|---|---|
| SRC | 000 |
| DST | 001 |
| Weight | 010 |
| DST_LOCK | 011 |
| SRC_LOCK | 100 |

Figure 6:
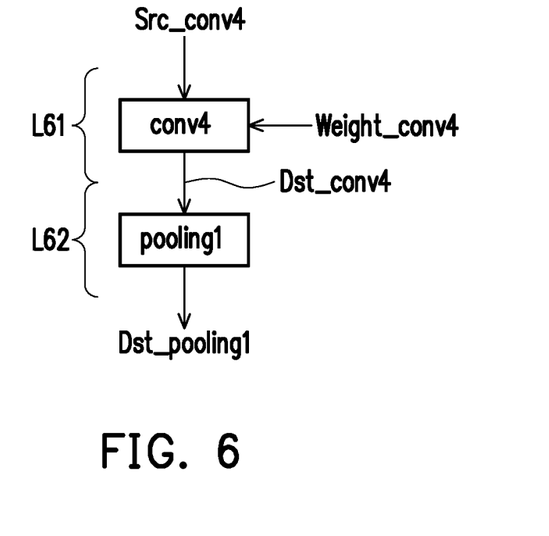
FIG. 6 is a schematic diagram of a partial structure of a neural network calculation according to another embodiment of the invention.

FIG. 6 is a schematic diagram of a partial structure of a neural network calculation according to another embodiment of the invention. The neural network calculation shown in FIG. 6 includes a plurality of calculation operations. Solid line boxes shown in FIG. 6 represent the calculation operations. Referring to FIG. 1, FIG. 5 and FIG. 6, the computing circuit 110 can perform the neural network calculation shown in FIG. 6. The neural network calculation shown in FIG. 6 includes an A layer calculation L61 and a B layer calculation L62. The A layer calculation L61 includes a single calculation operation conv4, such as a convolutional calculation. The cache circuit 120 can define weight matrix data Weight_conv4 as the weight type "Weight" and define source matrix data Src_conv4 as the source type "SRC". The cache circuit 120 can provide the source matrix data Src_conv4 (source data) and the weight matrix data Weight_conv4 (weight data) to the computing circuit 110 for the A layer calculation L61 to use, that is, as two inputs to the calculation operation conv4. The computing circuit 110 can perform and complete the calculation operation conv4 to generate a calculation result Dst_conv4. After the computing circuit 110 completes the calculation operation conv4 (the A layer calculation L61), the cache circuit 120 can define the calculation result Dst_conv4 as the destination type "DST". In response to the B layer calculation L62 including a single calculation operation, the cache circuit 120 can maintain the calculation result Dst_conv4 as the destination type "DST". The calculation result Dst_conv4 can be retained in the cache circuit 120 until the B layer calculation L62 is completed (i.e., the B layer calculation L62 no longer needs to use the calculation result Dst_conv4).

After the computing circuit 110 completes the A layer calculation L61 (the calculation operation conv4), in response to the source matrix data Src_conv4 not defined as the source lock type "SRC_LOCK", the source matrix data Src_conv4 in the cache circuit 120 can be invalidated instantly to free the cache space and prevent the source matrix data Src_conv4 from being written into the main memory 130. According to the characteristics of the neural network calculation, in some embodiments, the weight matrix data Weight_conv4 may no longer be needed after the A layer calculation L61 is completed. In this case, the cache circuit 120 can redefine the weight matrix data Weight_conv4 from the weight type "Weight" to the source type "SRC" after the A layer calculation L61 is completed. Then, the cache circuit 120 can invalidate the weight matrix data Weight_conv4 defined as the source type "SRC" to prevent the weight matrix data Weight_conv4 from being written into the main memory 130.

The B layer calculation L62 shown in FIG. 6 includes a single calculation operation pooling1, such as a pooling calculation. The cache circuit 120 can redefine the calculation result Dst_conv4 from the destination type "DST" to the source type "SRC". The cache circuit 120 can provide the calculation result Dst_conv4 to the computing circuit 110 for the B layer calculation L62 to use, i.e., as an input to the calculation operation pooling1. The computing circuit 110 can perform and complete the calculation operation pooling1 to generate a calculation result Dst_pooling1. The cache circuit 120 can define the calculation result Dst_pooling1 as the destination type "DST". Assuming that the B layer calculation L62 is the last layer of the neural network calculation, the calculation result Dst_pooling1 (a final result of the neural network calculation) will be flushed out from the cache circuit 120 into the main memory 130. After the computing circuit 110 completes the B layer calculation L62 (the calculation operation pooling1), the calculation result Dst_conv4 in the cache circuit 120 can be invalidated instantly to free the cache space and prevent the calculation result Dst_conv4 from being written into the main memory 130.

Figure 7:
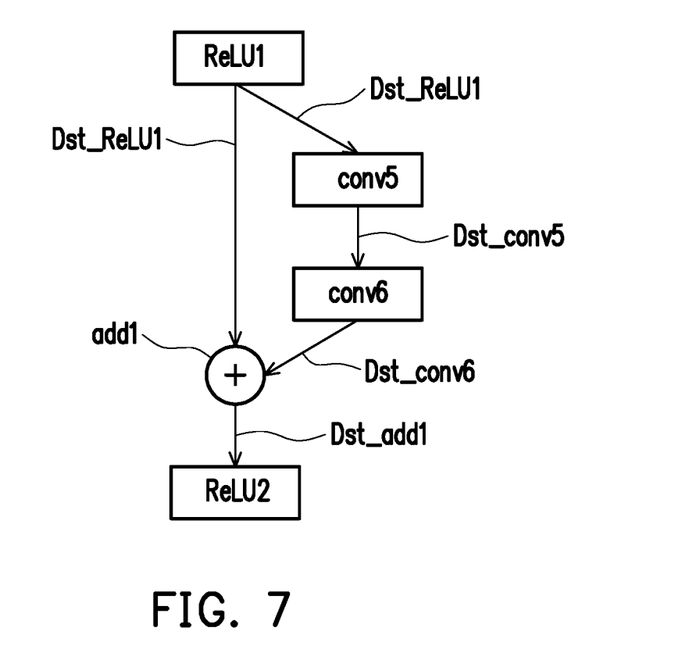
FIG. 7 is a schematic diagram of a partial structure of a neural network calculation according to yet another embodiment of the invention.

FIG. 7 is a schematic diagram of a partial structure of a neural network calculation according to yet another embodiment of the invention. The neural network calculation shown in FIG. 7 is a partial structure of a residual connection, which includes calculation operations ReLU1, conv5, conv6, add1 and ReLU2. The calculation operations ReLU1 and ReLU2 may be ReLU (Rectified Linear Unit) function calculations. The calculation operations conv5 and conv6 may be convolution calculations. The calculation operation add1 may be an addition calculation. The computing circuit 110 can perform and complete the calculation operation ReLU1 to generate a calculation result Dst_ReLU1. After the computing circuit 110 completes the calculation operation ReLU1 (the first layer calculation), the cache circuit 120 can define the calculation result Dst_ReLU1 as the destination type "DST".

In response to the next layer calculation of the calculation operation ReLU1 including a plurality of calculation operations, based on the control of the computing circuit 11, the cache circuit 120 redefines the calculation result Dst_ReLU1 from the destination type "DST" to the destination lock type "DST_LOCK" to ensure that the calculation result Dst_ReLU1 is not removed from the cache circuit. In other words, the calculation result Dst_ReLU1 can be retained in the cache circuit 120 until the calculation operation conv5 and the calculation operation add1 are all completed. In order to achieve such a purpose, in other embodiments, the cache circuit 120 can directly define the calculation result Dst_ReLU1 as the destination lock type "DST_LOCK" instead of redefining it from the destination type "DST" to the destination lock type "DST_LOCK".

Before the calculation operation conv5 and the calculation operation add1 are performed, the cache circuit 120 can redefine the calculation result Dst_ReLU1 from the destination lock type "DST_LOCK" to the source lock type "SRC_LOCK" for the calculation operation conv5 and the calculation operation add1 to use and ensure that the calculation result Dst_ReLU1 is not removed from the cache circuit 120. The cache circuit 120 can provide the calculation result Dst_ReLU1 to the computing circuit 110. The computing circuit 110 can perform and complete the calculation operation conv5 by using the calculation result Dst_ReLU1 to generate a calculation result Dst_conv5. The cache circuit 120 can define the calculation result Dst_conv5 as the destination type "DST".

Before the calculation operation conv6 is performed, the cache circuit 120 can redefine the calculation result Dst_conv5 from the destination type "DST" to the source type "SRC" for the calculation operation conv6 to use. The cache circuit 120 can provide the calculation result Dst_conv5 to the computing circuit 110. The computing circuit 110 can perform and complete the calculation operation conv6 by using the calculation result Dst_conv5 to generate a calculation result Dst_conv6. The cache circuit 120 can define the calculation result Dst_conv6 as the destination type "DST". After the computing circuit 110 completes the calculation operation conv6, based on the control of the computing circuit 110, the cache circuit 120 can instantly invalidate the calculation result Dst_conv5 defined as the source type "SRC" to free the cache space and prevent the calculation result Dst_conv5 from being written into the main memory 130.

Before the calculation operation add1 is performed, the cache circuit 120 can redefine the calculation result Dst_conv6 from the destination type "DST" to the source type "SRC" After the calculation operations conv5, conv6 and ReLU1 are all completed, the cache circuit 120 can redefine the calculation result Dst_ReLU1 from the source lock type "SRC_LOCK" to the source type "SRC". The cache circuit 120 can provide the calculation results Dst_conv6 and Dst_ReLU1 defined as the source type "SRC" to the computing circuit 110. The computing circuit 110 can perform and complete the calculation operation add1 by using the calculation results Dst_conv6 and Dst_ReLU1 to generate a calculation result Dst_add1. The cache circuit 120 can define the calculation result Dst_add1 as the destination type "DST". After the computing circuit 110 completes the calculation operation add1, based on the control of the computing circuit 110, the cache circuit 120 can instantly invalidate the calculation results Dst_conv6 and Dst_ReLU1 defined as the source type "SRC" to free the cache space and prevent the calculation results Dst_conv6 and Dst_ReLU1 from being written into the main memory 130.

Based on the different design requirements, the blocks of the computing circuit 110, the cache circuit 120 and (or) the cache control circuit 122 may be implemented in form of hardware, firmware, software or a combination of multiples among the three.

In form of hardware, the blocks of the computing circuit 110, the cache circuit 120 and (or) the cache control circuit 122 may be implemented as logic circuits on an integrated circuit. The related functions of the computing circuit 110, the cache circuit 120 and (or) the cache control circuit 122 may be implemented as hardware using hardware description languages (e.g., Verilog HDL or VHDL) or other suitable programming languages. For instance, the related functions of the computing circuit 110, the cache circuit 120 and (or) the cache control circuit 122 may be implemented as various logic blocks, modules and circuits in one or more controllers, microcontrollers, microprocessors, application-specific integrated circuits (ASIC), digital signal processors (DSP), field programmable gate arrays (FPGA) and/or other processing units.

In form of software/firmware, the related functions of the computing circuit 110, the cache circuit 120 and (or) the cache control circuit 122 may be implemented as programming codes. For example, the computing circuit 110, the cache circuit 120 and (or) the cache control circuit 122 may be implemented using common programming languages (e.g., C or C++) or other suitable programming languages. The programming codes may be recorded/stored in a recording medium. The recording medium includes, for example, a read only memory (ROM), a storage device and/or a random access memory (RAM). A computer, a central processing unit (CPU), a controller, a microcontroller or a microprocessor can read and execute the programming codes from the recording medium to achieve the related functions. A "non-transitory computer readable medium" (including a tape, a disk, a card, a semiconductor memory, a programmable logic circuits, etc.) may be used as the recording medium. Moreover, the programming codes may also be provided to the computer (or the CPU) via any transmission medium (a communication network or a broadcast wave). The communication network is, for example, Internet, a wired communication, a wireless communication or other communication media.

In summary, the neural network computing device 100 and the cache management method thereof described in the above embodiments are applicable to the field of artificial intelligence (AI). After the computing circuit 110 completes the first layer calculation, the first calculation result may be retained (locked) in the cache circuit until the second layer calculation finish using the first calculation result. Therefore, the cache circuit 120 can ensure that the first calculation result is not removed from the cache circuit 120, so as to prevent the first calculation result from being read from the main memory 130. After the second layer calculation is completed, the first calculation result retained in the cache circuit 120 can be invalidated instantly to free the cache space and prevent the first calculation result from being written into the main memory 130. Therefore, the neural network computing device 100 can minimize the data transmission between the cache circuit 120 and the main memory 130.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A neural network computing device, comprising:
    a computing circuit, applicable to perform a neural network calculation, wherein the neural network calculation comprises a first layer calculation and a second layer calculation;
    a main memory; and
    a cache circuit, coupled to the computing circuit and the main memory, wherein
    after the computing circuit completes the first layer calculation and generates a first layer calculation result required for the second layer calculation, the cache circuit retains the first layer calculation result in the cache circuit until the second layer calculation is completed; and
    in response to that the second layer calculation is completed, the first layer calculation result used for the second layer calculation is invalidated instantly by the cache circuit to prevent the first layer calculation result from being written into the main memory,
    wherein the cache circuit is configured to determine whether a calculation result of a neural network data is a destination lock type, wherein in response to that the calculation result of the neural network data is the destination lock type, the cache circuit ensures that the calculation result of the neural network data is not removed from the cache circuit,
    wherein the cache circuit comprises:
        a cache memory; and
        a cache control circuit, coupled to the computing circuit and the cache memory, wherein
    after the computing circuit completes the first layer calculation and generates the first layer calculation result required for the second layer calculation, the cache control circuit retains the first layer calculation result in the cache memory until the second layer calculation is completed;
    in response to that the computing circuit performs the second layer calculation after the first layer calculation is completed, the cache control circuit transmits the first layer calculation result from the cache memory to the computing circuit for the second layer calculation to use; and
    after the second layer calculation is completed, the cache control circuit invalidates the first layer calculation result retained in the cache memory to prevent the first layer calculation result from being written into the main memory.

2. The neural network computing device of claim 1, wherein when the computing circuit performs the second layer calculation after the first layer calculation is completed, the cache circuit provides the first layer calculation result to the computing circuit for the second layer calculation to use.

3. The neural network computing device of claim 1, wherein
    the cache circuit provides weight data and source data to the computing circuit for the first layer calculation to use; and
    after the computing circuit completes the first layer calculation, in response to the source data not defined as the source lock type, the cache circuit invalidates the source data to prevent the source data from being written into the main memory.

4. The neural network computing device of claim 1, wherein
    after the computing circuit completes the first layer calculation, the cache circuit defines the first layer calculation result as a destination type;
    in response to the second layer calculation including a single calculation operation, the cache circuit maintains the first layer calculation result as the destination type; and
    in response to the second layer calculation including a plurality of calculation operations, the cache circuit redefines the first layer calculation result from the destination type to the destination lock type to ensure that the first layer calculation result is not removed from the cache circuit.

5. The neural network computing device of claim 1, wherein
    after the computing circuit completes the first layer calculation, in response to the second layer calculation including a single calculation operation, the cache circuit defines the first layer calculation result as a destination type; and
    after the computing circuit completes the first layer calculation, in response to the second layer calculation including a plurality of calculation operations, the cache circuit defines the first layer calculation result as the destination lock type to ensure that the first layer calculation result is not removed from the cache circuit.

6. The neural network computing device of claim 5, wherein
    before the computing circuit performs the single calculation operation, the cache circuit redefines the first layer calculation result from the destination type to a source type for the single calculation operation to use;
    the computing circuit performs the single calculation operation by using the first layer calculation result to generate a second calculation result; and after the single calculation operation is completed, the cache circuit invalidates the first layer calculation result defined as the source type to prevent the first layer calculation result from being written into the main memory.

7. The neural network computing device of claim 5, wherein before the computing circuit performs the plurality of calculation operations, the cache circuit redefines the first layer calculation result from the destination lock type to the source lock type for the plurality of calculation operations to use and ensures that the first layer calculation result is not removed from the cache circuit;

the computing circuit performs the plurality of calculation operations by using the first layer calculation result to generate at least one second calculation result;

after the plurality of calculation operations are all completed, the cache circuit redefines the first layer calculation result from the source lock type to a source type; and the cache circuit invalidates the first layer calculation result defined as the source type to prevent the first layer calculation result from being written into the main memory.

* * * * *